United States Patent [19]
Gillick

[11] Patent Number: 4,793,278
[45] Date of Patent: Dec. 27, 1988

[54] TRAVEL DISTANCE INDICATING METHOD

[76] Inventor: Michael F. Gillick, 1838 Ellen Ave., San Jose, Calif. 95125

[21] Appl. No.: 933,040

[22] Filed: Nov. 19, 1986

[51] Int. Cl.[4] ............................................. G09F 9/00
[52] U.S. Cl. .................................. 116/323; 116/321; 116/29; 273/281
[58] Field of Search ................ 40/445, 490, 491, 594, 40/595; 116/225, 234, 235, 240, 321-324, 29, 201, 222; 235/70 B; 273/108, 281; 33/486, 494, 1 D, 1.5 D, 485, 487

[56] References Cited

U.S. PATENT DOCUMENTS

| | | | |
|---|---|---|---|
| 448,878 | 3/1891 | Clarke | 116/225 |
| 1,680,200 | 8/1928 | Blancafort | 116/29 |
| 1,699,847 | 1/1929 | Kuhlman | 33/486 |
| 1,898,308 | 2/1933 | Miller | 40/445 |
| 1,902,121 | 3/1933 | Gallagher | 40/491 |
| 1,902,925 | 3/1933 | Ward | 116/324 |
| 2,199,016 | 4/1940 | Watkins | 273/108 |
| 2,683,946 | 7/1954 | Olson | 40/490 |
| 2,988,845 | 6/1961 | MacDougall et al. | 40/445 |
| 3,126,862 | 3/1964 | Hanley | 116/240 |
| 3,130,984 | 4/1964 | Fenberg | 40/595 |
| 3,266,722 | 8/1966 | Hobbis | 116/323 |
| 3,495,700 | 2/1970 | Chandos | 206/25.33 |
| 3,495,701 | 2/1970 | Chandos | 206/45.33 |
| 4,009,679 | 3/1977 | Kircher | 116/225 |
| 4,235,459 | 11/1980 | Callahan | 283/7 |
| 4,373,732 | 2/1983 | Ogilvie | 273/271 |
| 4,619,221 | 10/1986 | Linstromberg | 116/307 |

Primary Examiner—William A. Cuchlinski, Jr.
Assistant Examiner—W. Morris Worth
Attorney, Agent, or Firm—Thomas Schneck

[57] ABSTRACT

A travel distance indicator having an elongated distance scale and a slidable marker member straddling the distance scale. A front leg of the marker member has a front projection which slidably fits within a channel extending lengthwise across a front surface of the distance scale. The channel stops short of each end of the distance scale to prevent the marker member from being inadvertently slid off an end of the distance scale. Pictorial symbols are removably attached to the front surface of the distance scale in the order in which various stops and observations are represented by the symbols are to occur. A marker in the shape of a motor vehicle is fixed to the marker member to give an appearance of a vehicle traveling along a road strip that is part of the distance scale. The road strip includes graduations which divide the distance bar into equal portions to represent equal portions of miles of travel.

1 Claim, 1 Drawing Sheet

U.S. Patent  Dec. 27, 1988  4,793,278
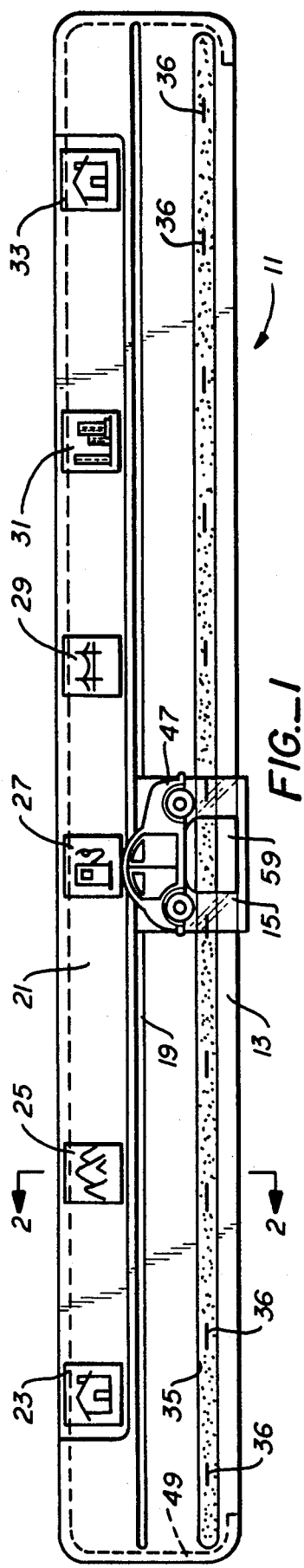
FIG._1.
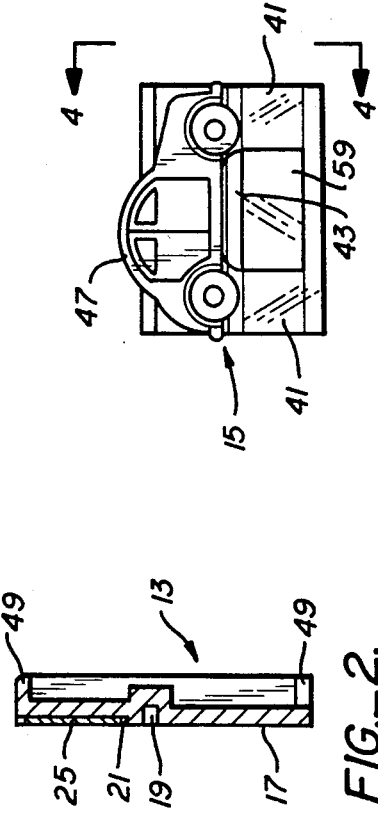
FIG._2.
FIG._3.
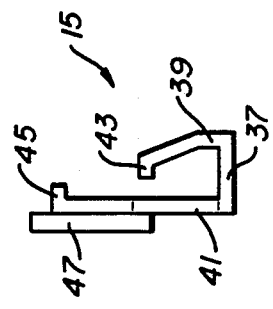
FIG._4.
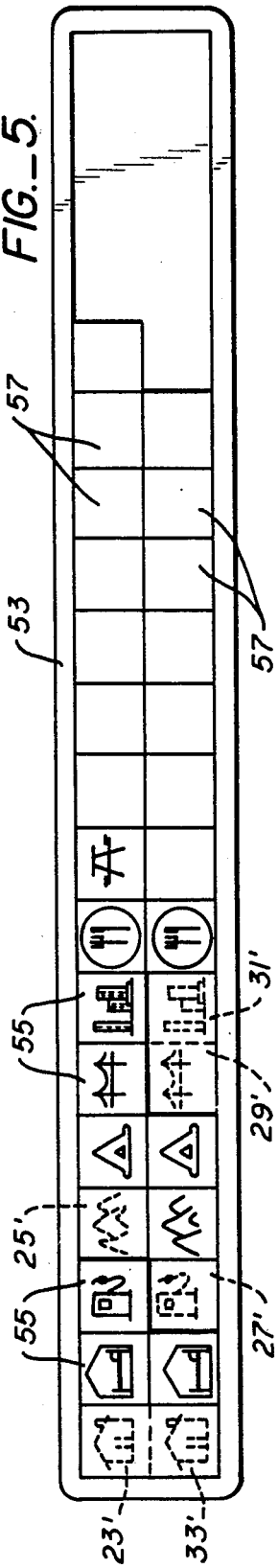
FIG._5.

4,793,278

TRAVEL DISTANCE INDICATING METHOD

TECHNICAL FIELD

The present invention relates generally to travel guides and more particularly to apparatus for indicating the progress of a motor vehicle.

BACKGROUND ART

Often times passengers in a motor vehicle focus on only two points—the starting point and the destination. This is particularly true of children, some of whom are prone to repeatedly ask, "Are we there yet?"

Amusement devices for occupying the attention of travelers are known. U.S. Pat. No. 3,495,700 to Chandos discloses a bingo-type game requiring the traveler to watch for animals, license plates, numbers and the like. As an object, is seen the traveler tears off perforated portions that are arranged in horizontal and vertical rows on a square game card.

U.S. Pat. No. 4,373,732 to Ogilvie is similar except that blocks having various scenes represented on different sides of the blocks are repositioned when a particular scene is viewed by the traveler. These games are intended to divert the attention of the traveler rather than to provide information regarding progression of travel.

An object of the present invention is to provide an easily transported device which indicates travel progress in an educational and entertaining manner.

DISCLOSURE OF THE INVENTION

The above object has been met by a device which visually indicates progress to be made while traveling from a starting point to a particular destination. Prior to the start of travel, the device is organized in accordance with the major landmarks that will be observed and the stops that will be made. Then, as each landmark is reached and each stop is made, progress is followed along the device.

The present invention includes an elongated distance scale having a channel extending lengthwise across a front surface. A slidable marker member straddles the distance scale. A front leg of the slidable marker member has a projection which is slidably fit within the channel of the distance scale so that the marker member is able to move across the length of the distance scale. The channel wherein the projection travels stops short at each end of the distance scale to prevent the marker member from being inadvertently slid off an end of the distance scale.

Pictorial symbols are removably attached to the front surface of the distance scale. The symbols may represent a food or gasoline stop, or a major landmark along the way. The pictorial symbols are arranged in tee order in which various stops and observations will occur. As each does occur, the slidable marker member is adjusted accordingly. The symbols are also positioned using graduations which represent relative mileage along the distance scale. The graduations divide the distance scale into ten equal portions so that as the marker member is moved a visual indication of travel progress is provided.

The slidable marker member includes a marker in the shape of a motor vehicle. Additionally, the front surface of the distance scale has a portion that gives the appearance that the motor vehicle is traveling along a road. In this manner, the present invention conveys to the traveler the appreciation for the progress that is made from a starting point to a destination.

BRIEF DESCRIPTION OF THE DRAWINGS

FIG. 1 is a perspective frontal view of the present invention.

FIG. 2 is a side sectional view of the invention taken along lines 2—2 of FIG. 1.

FIG. 3 is a frontal view of the marker member of FIG. 1.

FIG. 4 is a side view of the marker member taken along lines 4—4 of FIG. 3.

FIG. 5 is a frontal view of the symbol retainer of the present invention.

BEST MODE FOR CARRYING OUT THE INVENTION

With reference to FIGS. 1 and 2, the travel distance indicator 11 includes a distance scale 13 and a slidable marker member 15. The distance scale 13 is an elongated bar member having a front surface 17 that is flat except for a channel 19 and a recessed area 21.

The recessed area 21 is indented 0.03 inches to accept pictorial symbols 23, 25, 27, 29, 31 and 33. The recess provides for easy alignment of the pictorial symbols 25–33. A strip 35 having the likeness of a road is silkscreened onto the front surface 17 to give the appearance of a vehicle on a road. The strip 35 includes graduations 36 which divide the strip into ten equal spaces to aid in gauging relative distance.

Now referring to FIGS. 3 and 4, the slidable marker member 15 has a bottom segment 37 that is attache to two legs 39 and 41 which straddle the distance scale 13. The rear leg 39 has an angled portion that terminates in a rear projection 43. The front leg 41 is perpendicular to the bottom segment 37 and terminates at a front projection 45. The different parts of the slidable marker member 15 combine to form a G-shaped configuration.

The image of a motor vehicle 47 is hot stamped onto the slidable marker member 15. Alternatively, the image may be silkscreened onto the marker member. The image is positioned so that when the marker member straddles the distance scale 13, the wheels of the motor vehicle are over the road strip 35, as can be seen in FIG. 1. The front projection 45 slidably fits within the channel 19 of the distance scale. The rear leg 39 and the rear projection 43 urge the front leg 41 against the distance scale 13 to securely hold the marker member onto the distance scale.

A ridge 49 extends about the perimeter of the back surface 51 of the distance scale. The ridge 49 terminates after making only a slight advance along the edge of the distance scale that is straddled by the marker member 15.

FIG. 5 shows a symbol retainer 53 having various pictorial symbols 55. The symbols 55 are preferably pressure sensitive removable stickers that permit reuse of the symbols. However, the symbols may be made in other known fashions permitting removal from the retainer 53 for connection to the recessed area 21 of the distance scale. The symbol retainer 53 of FIG. 5 illustrates that the symbols 23', 25', 27', 29', 31' and 33' have been removed and attached to the distance scale 13 of FIG. 1.

A number of blank stickers 57 may be added onto the symbol retainer 53 so that a traveler may draw desired symbols which are not normally furnished with the travel distance indicator 11. Typically, the symbols 55 that are furnished correspond to the international type symbols.

The distance scale 13 is thirteen inches long and is approximately 1.7 inches high by 0.187 inches wide at its maximum. The slidable marker member 15 is approximately 1.25 inches long and less than an inch wide. The marker member is made of a clear plastic material and has a cutout portion 59 to facilitate the sliding of the marker member.

In operation, prior to the start of a trip the travel distance indicator is prepared by taking symbols 55 from the symbol retainer 53. The symbols are attached to the distance scale 13. For example, FIG. 1 illustrates the preparation that would take place when the starting point is the home 23 of the traveler and a range of hills 25, a gasoline stop 27 and a bridge 29 will be seen or will occur prior to entering a city 31 in which the home 33 of a friend or relative will be reached. The symbols are positioned using the graduations 36 so that the symbols will indicate the distances that must be traveled between each landmark After the distance scale has been prepared the slidable marker member 15 is positioned to correspond with the symbol 23 representing the starting point. Then, as each landmark or stop is reached, the traveler slides the marker member along the road strip 35 to the symbol representing the point of progression. Additionally, the marker member is slid along the road strip 35 using the graduations 66 as a reference to correspond with an odometer reading For example, on a trip of 350 miles, each graduation represents a travel distance of 35 miles. In this manner the traveler is visually provided a current relationship of travel over the entire trip. If desired, the traveler may simultaneously participate in activities which divert the attention away from the boredom of traveling long distances. The present invention provides an educational and immediate visual indication of the progress that is made during travel and of the occurrences that must take place before a destination is reached.

I claim:

1. A method of tracking progress of travel during a journey comprising, positioning removable members on an elongated lengthwise ends and having a plurality of spaced apart graduations disposed to divide the length of said bar member into a plurality of equal sections, each section representing a portion of a journey, said first lengthwise end nearest a portion representing the start of said journey and said second lengthwise end nearest a portion representing a destination of said journey, said removable members each having a representation of an observation on said journey, said positioning of each of said removable members being in accordance with a section of said elongated bar representing a portion of said journey in which a corresponding observation will occur, locating a marker member at the first lengthwise end of said bar member, said marker member slidably fit to said bar member, sliding said marker member to coincide with a removable member having a representation of travel observation when said observation occurs, and sliding said marker member to coincide with a graduation when a portion of the journey represented by the section preceding said graduation has been completed.

* * * * *

UNITED STATES PATENT AND TRADEMARK OFFICE
CERTIFICATE OF CORRECTION

PATENT NO. : 4,793,278

DATED : December 27, 1988

INVENTOR(S) : Michael F. Gillick

It is certified that error appears in the above-identified patent and that said Letters Patent is hereby corrected as shown below:

Column 1, line 56, "are arranged in tee order" should read - - are arranged in the order - -.

Column 2, line 32, "that is attach to" should read - - that is attached to - -.

Column 3, line 29, "graduations 66 as a" should read - - graduations 36 as a - -.

Column 3, line 30, "reading For" should read - -reading. For-

Claim 1, column 4, lines 9-10, "on an elongated lengthwise ends" should read - - on an elongated bar member, said bar member having first and second lengthwise ends - -.

Signed and Sealed this

Nineteenth Day of December, 1989

Attest:

JEFFREY M. SAMUELS

Attesting Officer     Acting Commissioner of Patents and Trademarks